Jan. 7, 1936.　　　F. J. WESTROPE　　　2,026,719
WINDOW SUPPORT AND REGULATING DEVICE
Filed Nov. 20, 1933
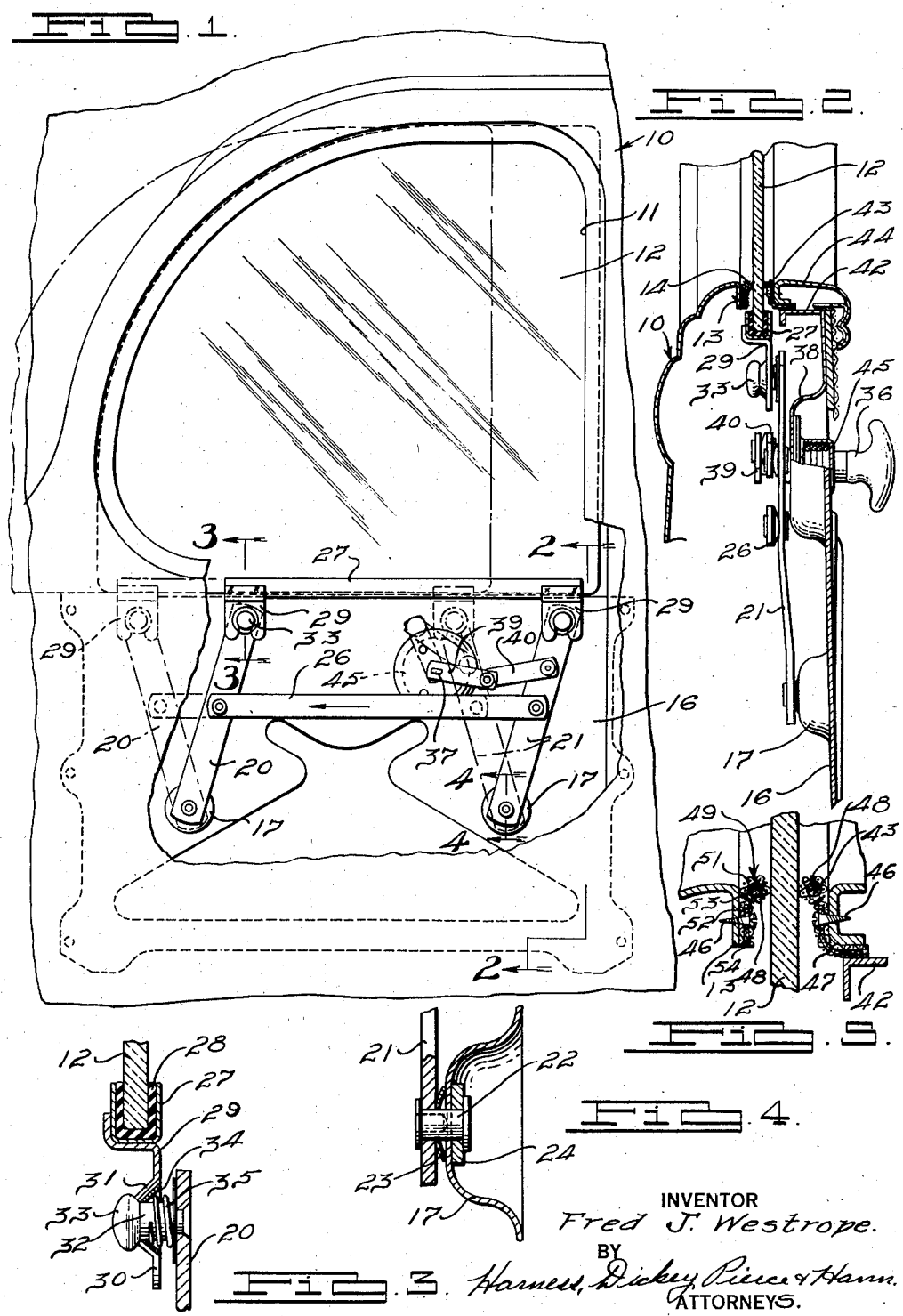
INVENTOR
Fred J. Westrope.
BY
Harness, Dickey, Pierce & Hann.
ATTORNEYS.

Patented Jan. 7, 1936

2,026,719

UNITED STATES PATENT OFFICE 2,026,719

WINDOW SUPPORT AND REGULATING DEVICE

Fred J. Westrope, Detroit, Mich., assignor to The Murray Corporation of America, a corporation of Delaware Application November 20, 1933, Serial No. 698,747

10 Claims. (Cl. 268—126)

The invention relates to closure operating devices and it has particular relation to a window regulating mechanism and support therefor, for use in motor vehicles.

One object of the invention is to provide an improved and inexpensive window regulating mechanism for use in conjunction with horizontally movable windows in motor vehicles.

Another object of the invention is to provide a window regulating mechanism for horizontally movable windows in motor vehicles wherein parallel arms will be used for moving the window and wherein the latter will be entirely supported on the arms.

Another object of the invention is to provide a window regulating mechanism of the above mentioned character which is so constructed and so related to the window that the latter may be readily removed so as to render assembly and replacement possible without difficulty.

Other objects of the invention will become apparent from the following description taken in conjunction with the drawing and from the claims hereinafter set forth.

For a better understanding of the invention, reference may be had to the drawing, wherein:

Figure 1 is a fragmentary view of an automobile body with certain parts broken away to illustrate a window regulating and supporting mechanism constructed according to one form of the invention.

Fig. 2 is a cross-sectional view on a larger scale taken substantially along the line 2—2 of Fig. 1.

Fig. 3 is a cross-sectional view on a larger scale taken substantially along the line 3—3 of Fig. 1.

Fig. 4 is a cross-sectional view on a larger scale taken substantially along the line 4—4 of Fig. 1, and Fig. 5 is an enlarged sectional view of the glass and sealing means.

Referring to Figs. 1 and 2, the body of the vehicle is indicated at 10, an opening for a window at 11, and the window at 12. Around the edge of the opening 11, the body panel is turned downwardly or toward the edge of the glass as indicated at 13, and weatherstripping 14 may be provided between the portion 13 and the glass. For moving the window horizontally between open and closed positions as shown by Fig. 1, a regulating mechanism is provided which is mounted on a plate 16 that in turn is secured to the body in any suitable way as will be readily understood in the art. This mounting plate has a pair of horizontally spaced inwardly pressed bell-shaped portions 17 and the base of each of these portions is apertured as shown by Fig. 4. Arms 20 and 21 are pivotally secured to the bell-shaped portions 17 by means of pins 22 passing through the lower ends of the arms and the ends of the pins are swaged over to form heads for holding the parts assembled. Between each arm and the bell-shaped portion 17 a spring washer or disc 23 may be provided to take up looseness and prevent rattling, and for reinforcement purposes a washer 24 may be provided between the base of the bell-shaped portion and the adjacent head on the pin. The arms are connected intermediate their ends by a link 26 and it follows that both arms will move together when either arm is moved.

As best shown by Fig. 3, the lower edge of the window glass is disposed in a metal channel 27 which may have a rubber channel 28 therein for directly and tightly receiving the glass and the metal channel at spaced points has a pair of angular metal elements 29 welded thereto. Each of these elements has a vertically disposed flange 30 provided with a vertically directed slot open to the lower edge of the flange, and around the upper end of the slot, the metal is conically shaped as indicated at 31. The slot is adapted to receive a pin 32 secured to the upper end of each of the arms 20 and 21, and such pin has a rounded head 33 for abutting the flange at the sides of the slot. For normally urging the flange against the head 33, a conical washer 34 is disposed on the pin for seating in the conical portion 31 of the flange, and a spring 35 on the pin normally urges the washer against the portion 31 and the latter against the head 33.

The conical portion 31 of the elements 29 engages the conical shaped washer 34 over substantially its entire periphery except for the cutout portion 30 which permits the portion 31 to slide over the pin 32. This relation provides a lock against vertical movement of the elements 29, and therefore the window, relative to the arms 20 and 21 which are its only support. It is necessary to tilt the window to change the relation between the portion 31 and washer 34 to release the locking engagement thereof. Thereafter an upward movement in the plane in which the window is tilted will release the window completely from the arms.

When inserting the window, the elements 29 are moved downwardly over the pins 33 while disposed in angular relation to the arms 20 and 21 and after the elements 29 are slid over the pins the movement of the window to vertical position causes the washer 34 to move into locked engagement with the conical portions 31 of the elements 29 to thereby retain the window against vertical movement relative to the arms which are its only support.

It is apparent that the connection mentioned is such that the arms 20 and 21 may pivot with respect to the window during movement of the latter. Moreover, the connection is of such character that looseness and play are avoided as the spring at all times resiliently holds the parts together. It should be understood that the window is solely supported by the arms 20 and 21 and that it may be readily released from the arms by angularly lifting it.

The arms 20 and 21 are moved by means of a handle 36, mounted on a pin 37 which is journaled in a bell-shaped portion 38 of the plate 16, and such pin at its inner end has a short link 39 secured thereto. The link 39 in turn is pivotally connected to a link 40 that in turn is pivotally connected to the arm 21. By turning the handle 37 the link 39 will be turned and the parts moved to positions as shown by broken lines. It is to be noted that when the window is in its closed position the arms 20 and 21 will be to the right of vertical positions and hence the weight of the window will assist in maintaining it in its closed position owing to the gravitational force tending to still further move the arms clockwise. When the handle 37 is turned to open the window, the arms 20 and 21 will first move to vertical positions and during this movement the window must be raised slightly and this may be advantageous particularly in releasing the window from its closed position.

The handle 36 actuates a clutch locking device of conventional form which is enclosed in a housing 45. The device includes a coil spring having the ends in position to be engaged by the shaft supporting the handle 36 to be loosened through the turning of the shaft so that the handle may operate the window to various positions. The device is available, however, to prevent the handle from turning when the window is urged to slide which is thereby locked in any of its positions. A further lock is provided by the links 39 and 40 which are illustrated as being in overtoggle relation and which further prevents the possibility of the window being shifted when in closed positon without manipulating the handle 36.

In Fig. 5 I have illustrated the weatherstrip 43 as being secured to the flange on the plate 16 by metal engaging screws 46 which are secured to a flange portion 47 of the strip. The screws are in spaced relation to each other but in view of the flange 47 of the sealing element 43, a bead 48 will be retained in a straight line and will therefore contact the window throughout its length. In a similar manner a seal element 49 is mounted on the inside of the window being retained against the flange 13 of the panel 10 by spaced screws 46 which likewise retain the bead portion 48 in continuous contact with the glass to form an effective seal. The strip is illustrated as comprising a cord 51 having a fabric strip 52 secured thereabout by stitches 53 to form the bead 48. To provide a flange portion 47 to the ends of the fabric, a stiffening strip 54 is employed which may be of rubber, metal, fibre or the like, to provide a body to the portion below the head 48.

Molding 44 preferably in the form of a frame is disposed around the inner side of the window and ordinarily is secured by screws to parts of the body and to the flange portion 42 of the mounting plate at the lower edge of the window. When it is desired to replace the window it is only necessary to remove the molding frame 44 and then insert the window having the channel portion 27 on its lower edge until the metal elements 29 properly are engaged with the pins 31 on the upper ends of the arms 20 and 21. Insertion and removal of the window is accomplished by first tilting it an appreciable amount, as pointed out hereinabove.

It will be appreciated in view of the description and drawing that the window is supported entirely on the regulating mechanism and that it may be readily installed and replaced without removing any part of the mechanism proper. Furthermore, the mechanism is inexpensive as it may be largely produced from stamped sheet metal and may be entirely assembled with the mounting plate before the latter is inserted.

Although only one form of the invention has been described and illustrated in detail, it will be apparent to those skilled in the art that various changes, omissions, additions and substitutions may be made without departing from the scope of my invention, as set forth in the appended claims.

I claim as my invention:

1. In combination, a vehicle body having a window opening, a window movable forwardly and rearwardly across said opening, a pair of arms pivoted at their lower ends below said window opening and near their upper ends to said window, means pivotally connecting the arms for united movement about their lower pivots to open and close the window, said arms constituting the sole support for the window.

2. In combination, a vehicle body having a window opening, a window movable forwardly and rearwardly across said opening, a pair of arms pivoted at their lower ends below said window opening, releasable means pivotally connecting said arms to the lower edge of said window in such manner as to prevent the disconnection therebetween when the window is vertically moved, and means for moving the arms about their lower pivots to open and close the window, said arms constituting the sole support for said window.

3. In combination, a vehicle body having a window opening, a window movable forwardly and rearwardly across said window opening, a pair of arms below said window opening, a channel receiving the lower edge of the window, a slot and pin connection between the channel and the upper end of each arm forming a lock which prevents the vertical movement of the window, and means for moving the arms about their pivots for actuating said window.

4. In combination, a vehicle body having a window opening, a window movable forwardly and rearwardly across said opening, a pair of arms, and releasable means joining the lower edge of the window to said arms for causing said window to move laterally therewith and for retaining the window against separation therefrom when moved in its plane but permitting its release therefrom upon the lateral tilting of the window.

5. In combination, a vehicle body having a window opening, a window movable forwardly and rearwardly across said opening, arms disposed below said opening, a channel receiving the lower edge of the window, slotted releasable means joining said arms to said channel, and locking means retaining said slotted means to said arms against direct vertical movement while permitting a release therebetween when said window is tilted.

6. In combination, a vehicle body having a window opening, a window movable forwardly and rearwardly across said opening, a channel receiving the lower edge of the window and being movable therewith, a pair of arms disposed in generally vertical positions below the window, means pivotally mounting lower end portions of the arms on the body, and releasable means pivotally connecting the upper ends of the arms to the channel in such manner as to prevent the release of the channel from the arms when the channel is vertically moved.

7. In combination, a vehicle body having a window opening, a window movable forwardly and rearwardly across said opening, a channel receiving the lower edge of the window and being movable therewith, a pair of arms disposed in generally vertical positions below the window, means pivotally mounting lower end portions of said arms, and means pivotally connecting the upper ends of the arms to the channel, said last mentioned means comprising a releasable slot and pin connection, and means locking said connection to prevent the vertical separation of the window from said arms.

8. A vehicle body having a window opening, a window movable forwardly and rearwardly thereacross, a pair of pivotal arms having on the extending ends a pin, a dish-shaped washer and a spring on said pins, and slotted extensions on said window having pressed out portions which are received by said pins and engaged by said washers about the greater portion of their circumference to lock the window against separation from said pins unless tilted inwardly relative to the vehicle body.

9. A vehicle body having a window opening, in combination with a window movable forwardly and rearwardly thereacross, arms solely supporting said window, means for operating said arms, and locking means for engaging said operating means to prevent the window from being moved other than by the actuation of said operating means.

10. A vehicle body having a window opening, in combination with a window movable forwardly and rearwardly thereacross, pivotal arms solely supporting the window, means to operate said arms, locking means for engaging said operating means to prevent the window from being moved other than through said operating means, and a toggle element movable over center position to provide a further lock for the window when closed.

FRED J. WESTROPE.